(12) United States Patent
Yun

(10) Patent No.: US 11,014,623 B2
(45) Date of Patent: May 25, 2021

(54) INTELLIGENT HEADLIGHT SYSTEM FOR BICYCLE

(71) Applicant: Jong Gu Yun, Seongnam-si (KR)

(72) Inventor: Jong Gu Yun, Seongnam-si (KR)

(\*) Notice: Subject to any disclaimer, the term of this patent is extended or adjusted under 35 U.S.C. 154(b) by 0 days.

(21) Appl. No.: 16/578,150

(22) Filed: Sep. 20, 2019

(65) Prior Publication Data

US 2020/0010136 A1 Jan. 9, 2020

Related U.S. Application Data

(63) Continuation of application No. PCT/KR2018/003283, filed on Mar. 21, 2018.

(30) Foreign Application Priority Data

Mar. 24, 2017 (KR) .......................... 10-2017-0037758

(51) Int. Cl.
*B62J 6/02* (2020.01)
*F21S 45/42* (2018.01)
(Continued)

(52) U.S. Cl.
CPC ................ *B62J 6/02* (2013.01); *B60Q 1/085* (2013.01); *B60Q 1/18* (2013.01); *B62J 6/01* (2020.02);
(Continued)

(58) Field of Classification Search
CPC ........ B60Q 1/085; B60Q 1/1423; B60Q 1/18; B60Q 1/442; B60Q 1/50; B60Q 2300/114;
(Continued)

(56) References Cited

U.S. PATENT DOCUMENTS

| 4,868,720 A * | 9/1989 | Miyauchi | B60Q 1/115 |
| | | | 362/466 |
| 7,445,364 B2 * | 11/2008 | Gropp | F21S 41/62 |
| | | | 362/475 |

(Continued)

FOREIGN PATENT DOCUMENTS

| CN | 106394746 A | 2/2017 |
| DE | 20 2016 101 707 U1 | 4/2016 |

(Continued)

OTHER PUBLICATIONS

International Search Report issued in PCT/KR2018/003283; dated Jun. 27, 2018.

(Continued)

*Primary Examiner* — Tsion Tumebo
(74) *Attorney, Agent, or Firm* — Studebaker & Brackett PC

(57) ABSTRACT

A intelligent headlight system for a bicycle according to an embodiment of the present invention comprises: a bicycle body; a portable terminal which may be carried by a rider of the bicycle body and has a GPS module, for detecting the location information of the bicycle body, so as to measure the running speed on the basis of the location information of the bicycle body; and a headlight apparatus which is disposed on the bicycle body so as to cast light on the scene ahead of the bicycle body, is communicatably connected to the portable terminal so as to receive the running speed of the bicycle body, and is formed such that irradiation patterns may vary in accordance with the running speed of the bicycle body.

5 Claims, 12 Drawing Sheets

(51) Int. Cl.
  *F21S 41/141* (2018.01)
  *B60Q 1/08* (2006.01)
  *B60Q 1/18* (2006.01)
  *B62J 6/01* (2020.01)
  *B62J 45/00* (2020.01)
  *B62J 45/40* (2020.01)

(52) U.S. Cl.
  CPC ............. *F21S 41/141* (2018.01); *F21S 45/42* (2018.01); *B62J 45/00* (2020.02); *B62J 45/40* (2020.02)

(58) Field of Classification Search
  CPC ........... B60Q 2300/314; B60Q 2300/32; B62J 45/00; B62J 45/40; B62J 45/41; B62J 6/01; B62J 6/02; B62J 6/028; F21S 41/141; F21S 45/42; H05B 47/10
  See application file for complete search history.

(56) References Cited

U.S. PATENT DOCUMENTS

| | | | | |
|---|---|---|---|---|
| 9,221,509 | B2* | 12/2015 | Lai | B62J 6/01 |
| 2004/0141316 | A1* | 7/2004 | Twardawski | F21L 4/027 |
| | | | | 362/184 |
| 2010/0283590 | A1* | 11/2010 | Tee | B62J 6/04 |
| | | | | 340/432 |
| 2013/0026945 | A1* | 1/2013 | Ganick | H05B 45/10 |
| | | | | 315/246 |
| 2013/0027576 | A1* | 1/2013 | Ryan | H04N 5/3532 |
| | | | | 348/222.1 |
| 2016/0221627 | A1* | 8/2016 | Hines | H04M 1/72527 |
| 2017/0021884 | A1* | 1/2017 | Ebel | B62J 6/02 |
| 2017/0144586 | A1* | 5/2017 | Tokida | B60Q 1/143 |
| 2018/0020528 | A1* | 1/2018 | Luk | H05B 47/19 |
| 2018/0334216 | A1* | 11/2018 | Montez | B62K 21/12 |
| 2019/0002052 | A1* | 1/2019 | Chen | B62J 6/02 |
| 2019/0017691 | A1* | 1/2019 | Buhl | F21L 4/027 |

FOREIGN PATENT DOCUMENTS

| | | |
|---|---|---|
| JP | 2004-534683 A | 11/2004 |
| JP | 2008-218157 A | 9/2008 |
| JP | 2016-090318 A | 5/2016 |
| KR | 10-2011-0056262 A | 5/2011 |
| KR | 10-1534623 B1 | 7/2015 |
| KR | 10-1639531 B1 | 7/2016 |
| WO | 2015/121433 A1 | 8/2015 |

OTHER PUBLICATIONS

The extended European search report issued by the European Patent Office dated Feb. 13, 2020, which corresponds to European Patent Application No. 18771145.2—1009 and is related to U.S. Appl. No. 16/578,150.

* cited by examiner

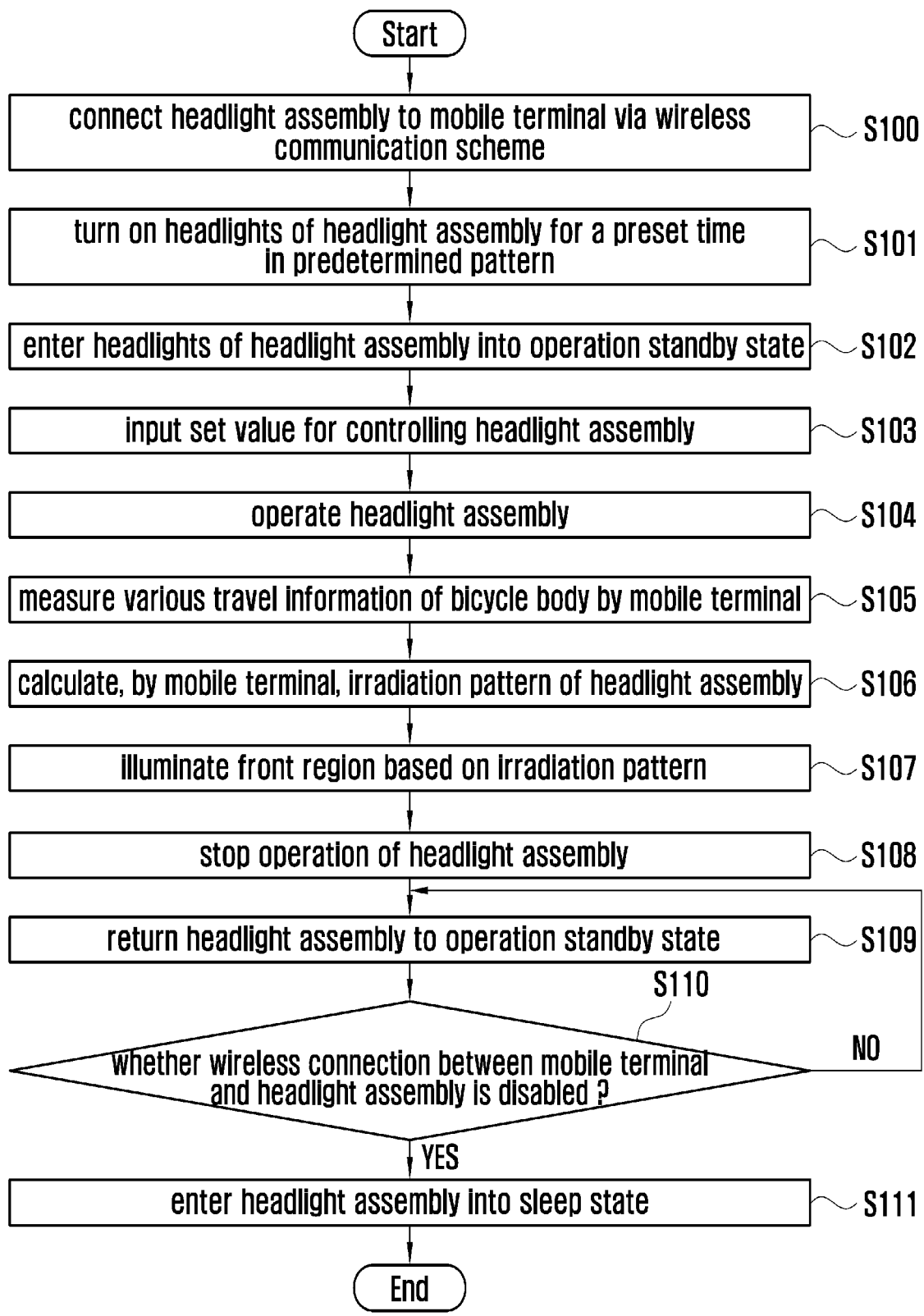

INTELLIGENT HEADLIGHT SYSTEM FOR BICYCLE

CROSS-REFERENCE TO RELATED APPLICATIONS

The present application is a continuation of International Patent Application No. PCT/KR2018/003283, filed Mar. 21, 2018, which is based upon and claims the benefit of priority to Korean Patent Application No. 10-2017-0037758, filed on Mar. 24, 2017. The disclosures of the above-listed applications are hereby incorporated by reference herein in their entirety.

BACKGROUND

The inventive concept relates to an intelligent headlight system for a bicycle and a control method of the system. More specifically, the inventive concept relates to an intelligent headlight system for a bicycle and a control method of the system in which a mobile terminal may be used to properly adjust an operation of a headlight based on a travel situation of the bicycle, thereby to improve performance, safety, and ease of use of the headlight.

In general, a bicycle collectively refers to a two-wheeled vehicle whose wheels rotate by human force. Bicycles may be divided into road bikes, mountain bikes, city bikes (life bikes) and special bicycles based on applications thereof.

Recently, bicycles are not merely recognized as means for transportation, but are widely used for sports, exercise, and leisure. For example, riders use their bicycles for commuting, as well as for professional leisure activities or sports on holiday or leisure time.

Riders, in particular, are more likely to ride their bikes at dawn on weekdays or in the evening after work. When riding the bicycle on a dark night, the user should install a headlight on the bicycle and it may be difficult for the rider to secure a good field of view and thus have increased risk of an accident.

Conventional headlights have been continuously improved in terms of headlight components. Improvement thereof is relatively slow in terms of technology that actively controls illumination based on a travel situation around the bike.

For example, the headlight component itself has been continuously developed from halogen lamps to HID (high intensity discharge) lamps and to LED lamps. In contrast, the conventional headlight is designed to simply illuminate a preset region in front of the bike. Thus, the illumination region of the headlight is very limited, thus making it difficult for the rider to ensure sufficient safety during a night travel of the bicycle. In order to solve this problem, a plurality of headlights are installed on the bicycle. However, in this case, a structure of the bicycle is complicated, as well as battery consumption is greatly increased, which makes it difficult to manage the headlights.

Recently, various attempts have been made to improve performance and utility of the bicycle headlight. For example, Korean Patent No. 10-1534623 (title of invention: a bicycle lighting device using a dual mode, issuance date: 2015.07.01) discloses a configuration that may freely control LED on/off operations or change brightness while the rider is traveling on a bicycle. In addition, Korean Patent No. 10-(title of invention: bicycle illumination device, issuance date: 2016.07.07) disclose a configuration that may secure front Field of View (FOV) according to a travel status and a travel environment of a bicycle during the bicycle travel, and may allow a following bicycle rider or vehicle driver to view the bicycle in an improved visibility.

SUMMARY

Embodiments of the inventive concept provide an intelligent headlight system for a bicycle and a control method of the system, in which a travel situation and a surrounding environment of a bicycle are detected using a mobile terminal carried by the rider and then an operation of a headlight is optimized based on the detection result.

Further, embodiments of the inventive concept provide an intelligent headlight system for a bicycle and a control method of the system, in which an operation of a headlight using various modules of a mobile terminal is controlled such that an overall structure of the headlight is simple, and thus the headlight is easily applied to various bicycles and is implemented at a low cost.

Further, embodiments of the inventive concept provide an intelligent headlight system for a bicycle and a control method of the system, in which appropriately adjusting an irradiation pattern of a headlight based on a travel velocity, a travel direction, map information, a luminance, and rapid deceleration of a bicycle allows performance, safety and usability of the headlight to be improved.

Further, embodiments of the inventive concept provide an intelligent headlight system for a bicycle and a control method of the system, in which an operation condition and various set values of a headlight may be easily set using an application installed in a mobile terminal.

According to an exemplary embodiment, the inventive concept provides an intelligent headlight system for a bicycle, the system including a bicycle body; a mobile terminal carried by a rider of the bicycle body and having a GPS module for detecting position information of the bicycle body to measure a travel velocity based on the position information of the bicycle body; and a headlight assembly disposed on the bicycle body to illuminate a region in front of the bicycle body, wherein the headlight assembly is communicatively connected to the mobile terminal, and is configured to vary an irradiation pattern based on a travel velocity of the bicycle body.

Therefore, in the present embodiment, the irradiation pattern of the headlight assembly is appropriately changed based on the travel velocity of the bicycle body measured by the GPS module of the mobile terminal. Thus, the headlight assembly improves the illumination performance of the headlight assembly by illuminating light beams based on the irradiation pattern optimized for the travel velocity of the bicycle body. This maximizes travel safety of the bicycle body and ease of use of the headlight assembly.

In one aspect, the headlight assembly may include a plurality of headlights selectively activated based on the travel velocity of the bicycle body. At least one of an irradiation angle, an irradiation distance, an irradiation area, an irradiation form, a luminance, or an illumination color may be set to be different between the plurality of headlights based on a travel velocity range of the bicycle body.

In one aspect, the headlight assembly may include: a headlight housing removably coupled to the bicycle body; a first headlight mounted on a first headlight mount of the headlight housing and configured to illuminate a long-distance region in front of the bicycle body, wherein the first headlight is activated when the travel velocity of the bicycle body is included in a the first set velocity range; a second headlight mounted on a second headlight mount of the headlight housing and configured to illuminate a middle-distance region in front of the bicycle body, wherein the second headlight is activated when the travel velocity of the bicycle body is included in a second set velocity range lower than the first set velocity range; a third headlight mounted on a third headlight mount of the headlight housing and configured to illuminate a short-distance region in front of the bicycle body, wherein the third headlight is activated when the travel velocity of the bicycle body is included in a third set velocity range lower than the second set velocity range; and a headlight control module disposed inside the headlight housing and configured to receive an irradiation pattern calculated from the mobile terminal based on the travel velocity of the bicycle body and to selectively control the activation of the first headlight, the second headlight, or the third headlight based on the received irradiation pattern.

The headlight control module may include: a headlight transceiver connected to the mobile terminal via a wireless communication scheme to receive the irradiation pattern based on the travel velocity of the bicycle body; a power supply disposed inside the headlight housing to power the first headlight, the second headlight, the third headlight, and the headlight transceiver; and a headlight controller connected to the headlight transceiver and the power supply to control power to be supplied to the first headlight and the second headlight and the third headlight based on the travel velocity of the bicycle body.

The first headlight mount may be placed at a top level of a front face of the headlight housing be constructed to guide illumination from the first headlight forwardly. The second headlight mount may be placed at a middle level of the front face of the headlight housing and be constructed to guide illumination from the second headlight to be inclined downwardly from light beams from the first headlight and forwardly. The third headlight mount may be placed at a bottom level of the front face of the headlight housing and be constructed to guide illumination from the third headlight to be inclined downwardly from light beams from the second headlight and forwardly.

In this connection, the headlight housing may have a heat-dissipation hole for air cooling the first headlight, the second headlight, the third headlight, and the headlight control module. The heat-dissipation hole may be constructed to have a shape to allow air to be introduced into a front face of the headlight housing and then to pass through the first headlight, the second headlight, the third headlight, and the headlight control module and then to an outside.

In one aspect, the mobile terminal may include an application for manipulating an operation of the headlight assembly. The application may be configured to set at least one of the travel velocity range, the irradiation angle, the irradiation distance, the irradiation area, the irradiation form, the luminance, or the illumination color.

In one aspect, the mobile terminal may further include a terminal transceiver for connecting to the headlight assembly via a wireless communication scheme. When the headlight assembly is connected to the terminal transceiver, the headlight assembly may light up in a predefined pattern and then enters an operation standby state. When the headlight assembly is disconnected to the terminal transceiver, the headlight assembly may enter a sleep state.

The mobile terminal may further include a gyro sensor module for measuring a travel angular velocity of the bicycle body when the bicycle body is turned. The headlight assembly may further include a headlight pivoting module configured to pivot the headlights based on a pivoting direction and a pivoting angle of the headlights calculated from the travel angular velocity of the bicycle body.

The mobile terminal may further include a navigation module for providing map information of a surrounding when the bicycle body travels. The headlight assembly may further include a headlight pivoting module configured to pivot the headlights based on a pivoting direction and a pivoting angle of the headlights calculated from the surrounding map information of the bicycle body.

In this connection, the headlight pivoting module may include: a pivoting support disposed in the headlight housing or on the headlights to support and pivot at least one of the headlight housing or the headlights in an turning direction of the bicycle; and a pivoting driver disposed on the pivoting support to pivot the headlight housing or at least one of the headlights based on a pivoting direction and a pivoting angle of the headlights.

The mobile terminal may further include an acceleration sensor module for measuring a velocity change of the bicycle body. The headlight assembly may quickly flash the headlights at a preset warning color to warn a surrounding vehicle of sudden deceleration of the bicycle body.

The mobile terminal may further include a luminance sensor module for measuring a surrounding luminance of the bicycle body. The headlight assembly may automatically turn on or off the headlights based on the surrounding luminance of the bicycle body.

According to another aspect of the inventive concept, a control method of an intelligent headlight system may include a step in which a headlight assembly mounted on a bicycle body is connected to a rider's mobile terminal via a wireless communication scheme, a step in which, in wireless connection between the mobile terminal and the headlight assembly, headlights of the headlight assembly are turned on for a preset time in a predetermined pattern, and then enters an operation standby state, a step of inputting a set value for controlling the headlight assembly by manipulating an application of the mobile terminal, a step of operating the headlight assembly by manipulating an application of the mobile terminal, a step of calculating, by the mobile terminal, an irradiation pattern of the headlight assembly by measuring various travel information of the bicycle body, a step in which the headlight assembly receives the irradiation pattern of the headlight assembly from the mobile terminal and illuminates a front region based on the irradiation pattern, a step of stopping the operation of the headlight assembly through the application of the mobile terminal and returning the headlight assembly to an operation standby state, and a step in which, when the wireless connection between the mobile terminal and the headlight assembly is disabled, the headlight assembly enters a sleep state for power saving.

According to one aspect, in the step of entering the set value, the application may be used to set the irradiation pattern of the headlight assembly according to a set velocity range of the bicycle body. In the step of calculating the irradiation pattern, the irradiation pattern of the headlight assembly may be calculated based on a current travel velocity of the bicycle body measured by the GPS module of the mobile terminal. In the step of illuminating the front region based on the irradiation pattern, a headlight that matches the calculated irradiation pattern among the headlights of the headlight assembly may be selected and activated.

In this connection, in the step of calculating the irradiation pattern, the travel velocity of the bicycle body measured by the GPS module may be corrected with a Kalman filter to calculate a corrected travel velocity and an error covariance, and then the corrected travel velocity and the error covariance may be compared with the set velocity ranges to calculate the irradiation pattern of the headlight assembly.

Further, the irradiation pattern of the headlight assembly may be configured such that the higher the travel velocity of the bicycle body, narrower and longer the irradiation pattern whereas the lower the travel velocity of the bicycle body, the wider and shorter the irradiation pattern.

According to one aspect, in the step of entering the set value, the application may be used to set the irradiation pattern of the headlight assembly according to the travel angular velocity of the bicycle body. In the step of calculating the irradiation pattern, the irradiation pattern of the headlight assembly may be calculated based on the current travel angular velocity of the bicycle body measured by the gyro sensor module of the mobile terminal. In the step of illuminating the front region based on the irradiation pattern, the headlights of the headlight assembly may be pivoted based on the calculated irradiation pattern.

According to one aspect, in the step of entering the set value, the application may be used to set the irradiation pattern of the headlight assembly according to the surrounding map information of the bicycle body. In the step of calculating the irradiation pattern, the irradiation pattern of the headlight assembly may be calculated based on the current map information of the bicycle body provided by the navigation module of the mobile terminal. In the step of illuminating the front region based on the irradiation pattern, the headlights of the headlight assembly may be pivoted based on the calculated pivoting pattern.

According to one aspect, in the step of entering the set value, the application may be used to set a travel deceleration rate for determining rapid deceleration of the bicycle body and the irradiation pattern of the headlight assembly according to the rapid deceleration of the bicycle body. In the step of calculating the irradiation pattern, the rapid deceleration of the bicycle body may be calculated based on the current travel velocity change of the bicycle body measured by the acceleration sensor module of the mobile terminal. In the step of illuminating the front region based on the irradiation pattern, when it is determined that the bicycle body is in a deceleration state, the headlights of the headlight assembly may be operated in the set irradiation pattern.

According to one aspect, in the step of entering the set value, the application may be used to set activation or deactivation of the headlight assembly or an irradiation pattern thereof according to the surrounding luminance of the bicycle body. In the step of calculating the irradiation pattern, the current luminance of the bicycle body measured by the luminance sensor module of the mobile terminal may be used to calculate the activation or deactivation of the headlight assembly and the irradiation pattern thereof. In the step of illuminating the front region based on the irradiation pattern, the headlight assembly may be selectively operated based on the current luminance of the bicycle body and the headlights of the headlight assembly may be operated based on the calculated irradiation pattern during operation of the headlight assembly.

The intelligent headlight system for the bicycle and the control method of the system according to an embodiment of the inventive concept may control the operation and irradiation pattern of the headlight assembly using a rider's mobile terminal, such that the headlight assembly may be activated in an optimal manner based on the travel situation and surrounding environment of the bicycle body. Therefore, this embodiment may further improve the performance and the use effect of the headlight assembly, and, thus, the safety of the bicycle body during the travel may be further increased.

Further, the intelligent headlight system for the bicycle and the control method of the system according to an embodiment of the inventive concept may use various modules such as the GPS module, gyro sensor module, acceleration sensor module, navigation module, luminance sensor module, etc. of the mobile terminal to easily obtain information about the travel situation and surrounding environment of the bicycle body and may analyze in real time the detection values of the various modules to optimize the operation status and illumination performance of the headlight assembly.

Further, the intelligent headlight system for the bicycle and the control method of the system according to an embodiment of the inventive concept may use the application installed on the mobile terminal to allow the rider to easily set the operation condition and irradiation pattern of the headlight assembly and thus may appropriately provide the operation pattern and the irradiation pattern of the headlight assembly based on a preference and a habit of the rider and a body shape of the rider, or a state of the bicycle body and a road structure.

Further, the intelligent headlight system for the bicycle and the control method of the system according to an embodiment of the inventive concept may control the operation of the headlight assembly using the rider's mobile terminal, such that the structure of the headlight assembly may be simplified, and the headlight assembly may be easily applied to various kinds of bicycle bodies at low cost.

Further, the intelligent headlight system for the bicycle and the control method of the system according to an embodiment of the inventive concept may control a irradiation angle, a irradiation distance, an irradiation area, an irradiation form, a luminance, a illumination color, etc. of the headlight assembly based on a travel velocity of the bicycle body, a travel direction thereof, map information, a luminance of a surrounding, rapid deceleration, etc. thereby improving the illumination performance of the headlight assembly to maximize the travel safety and ease of use of the bicycle body.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 8 illustrates a control method of an intelligent headlight system according to an embodiment of the inventive concept.

DETAILED DESCRIPTION

Figure 1:
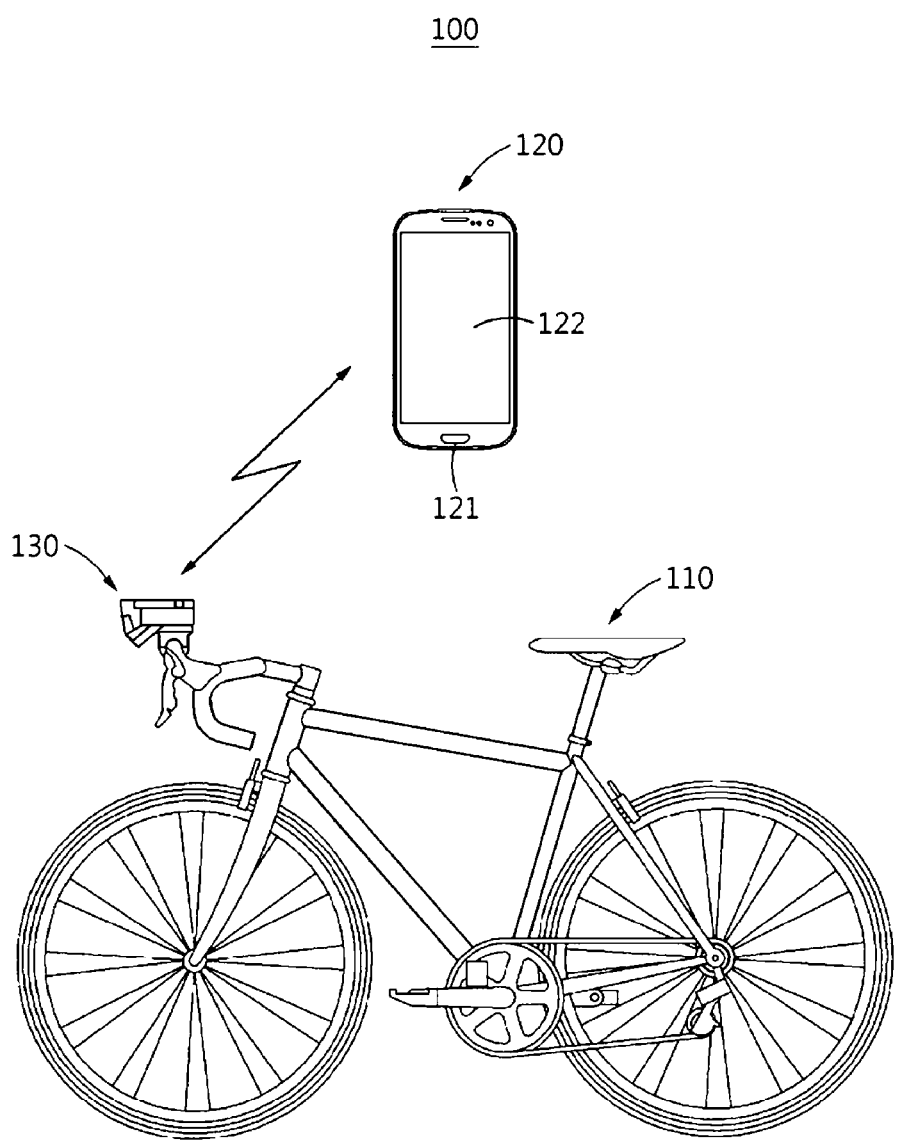
FIG. 1 is a diagram showing an intelligent headlight system for a bicycle according to an embodiment of the inventive concept.

Hereinafter, exemplary embodiments of the inventive concept will be described in detail with reference to the accompanying drawings. However, the inventive concept is not limited or restricted to the embodiments. Like reference numerals in the drawings denote like elements.

Figure 2:
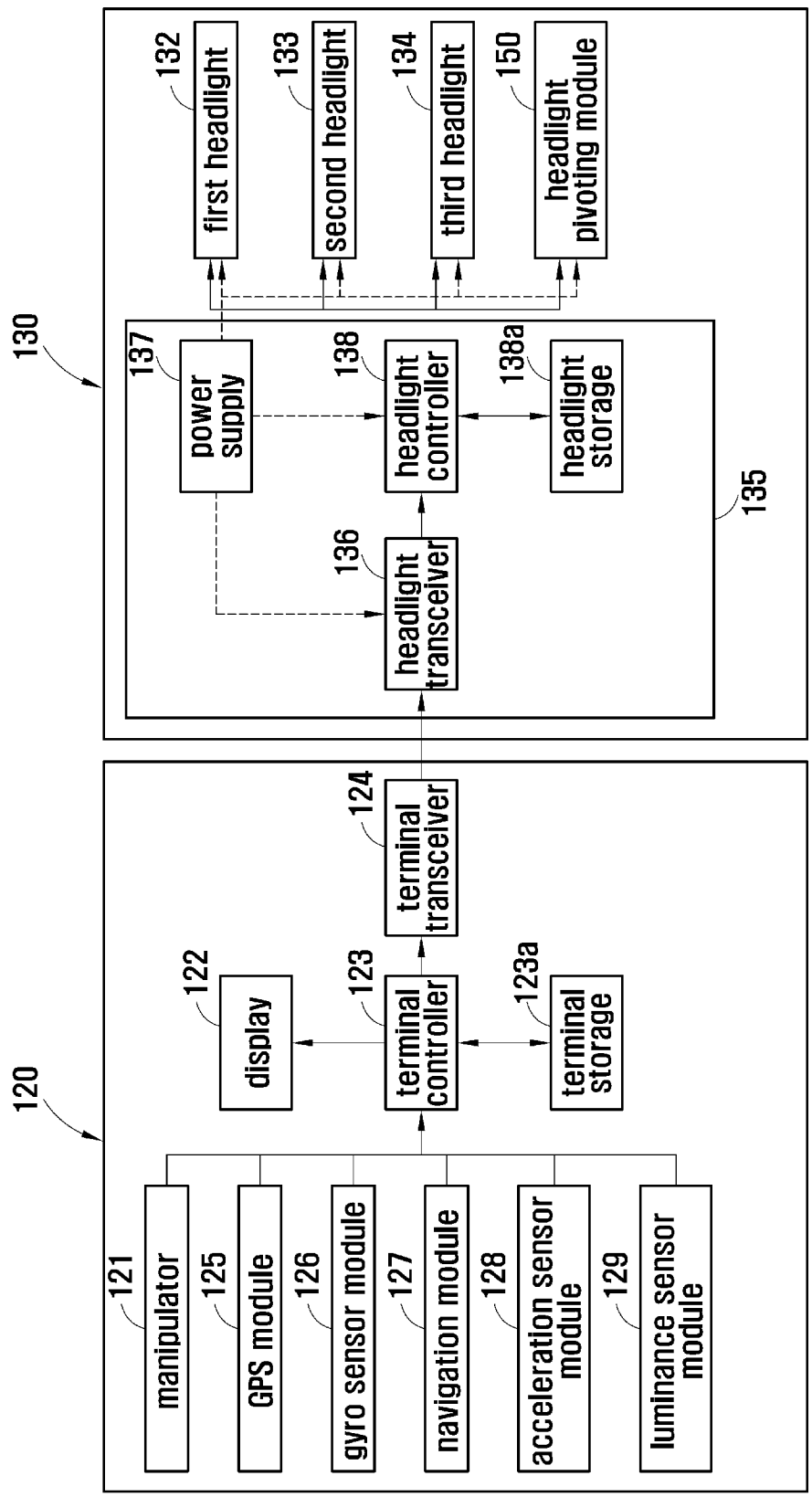
FIG. 2 shows a control configuration of the intelligent headlight system shown in FIG. 1.
Figure 3:
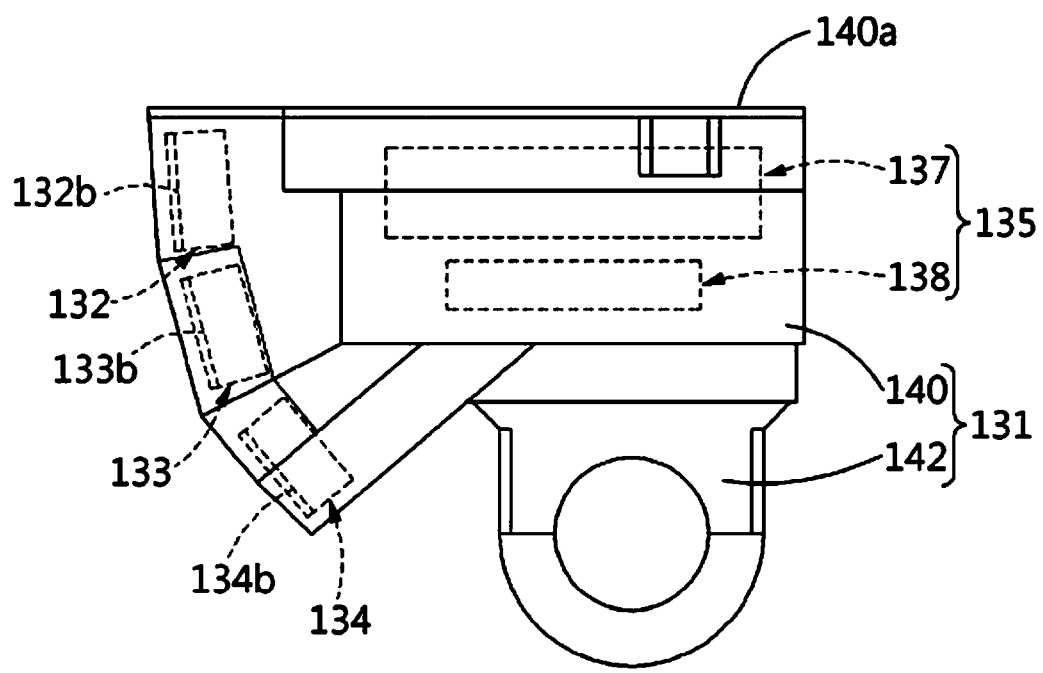
FIG. 3, FIG. 4 and FIG. 5 are respectively side, front and perspective views showing a headlight assembly of the intelligent headlight system shown in FIG. 1.
Figure 4:
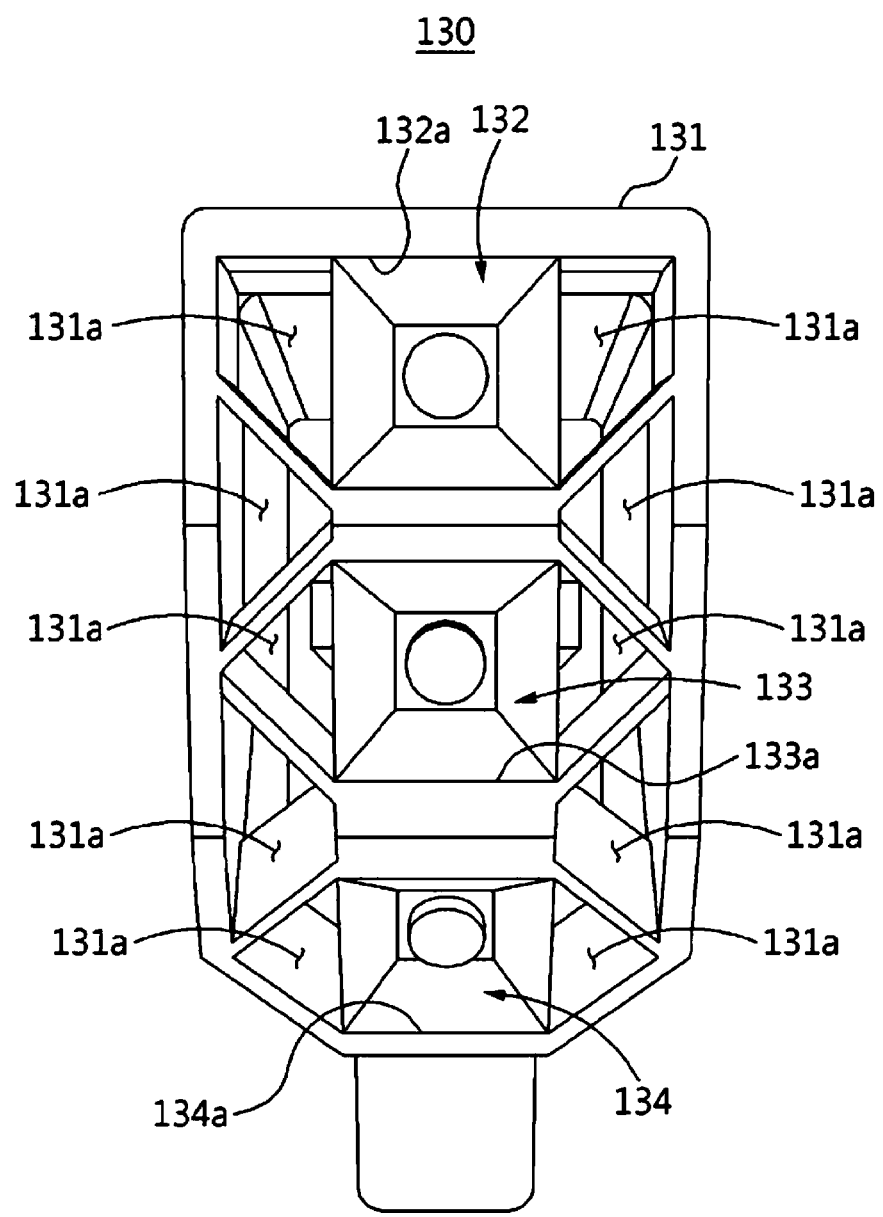
Figure 5:
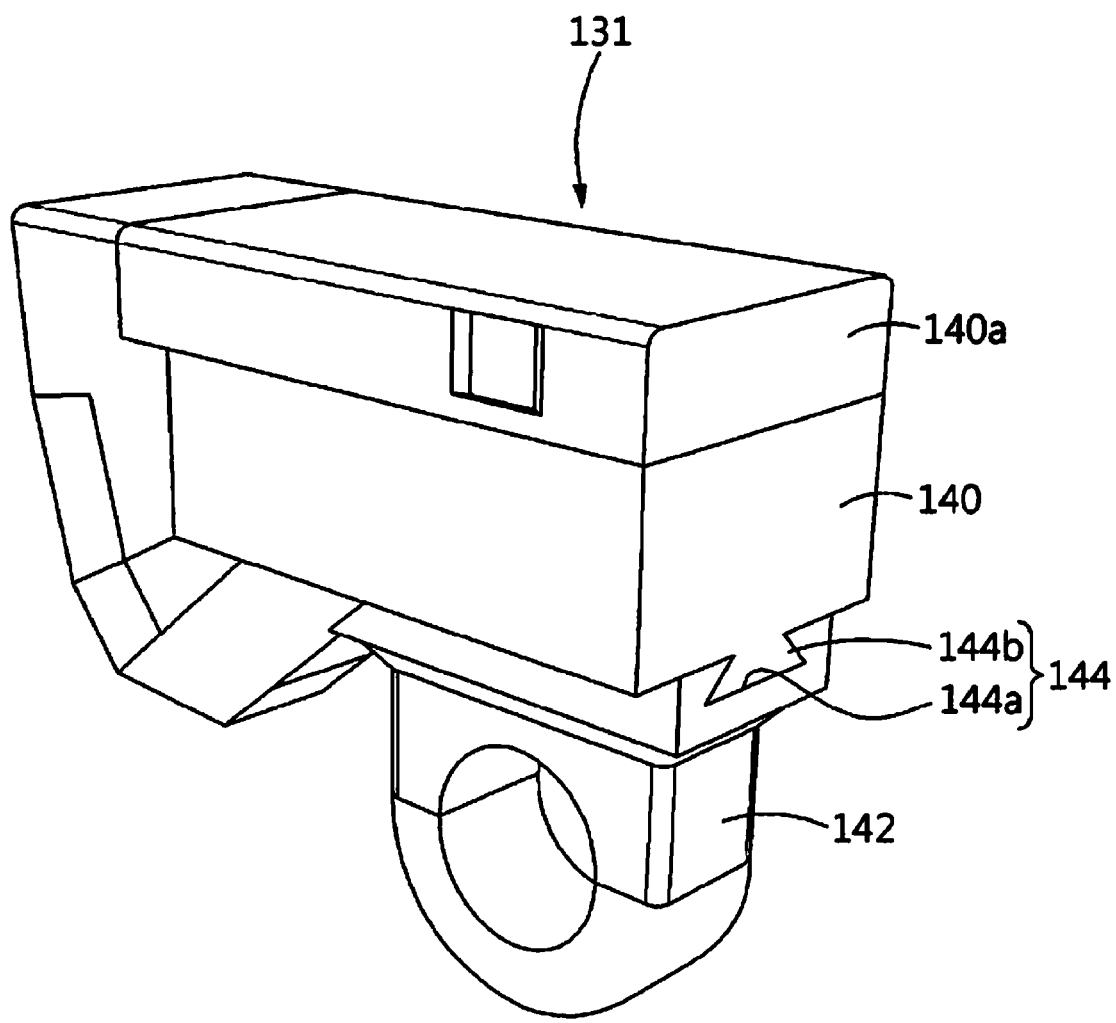
Figure 6:
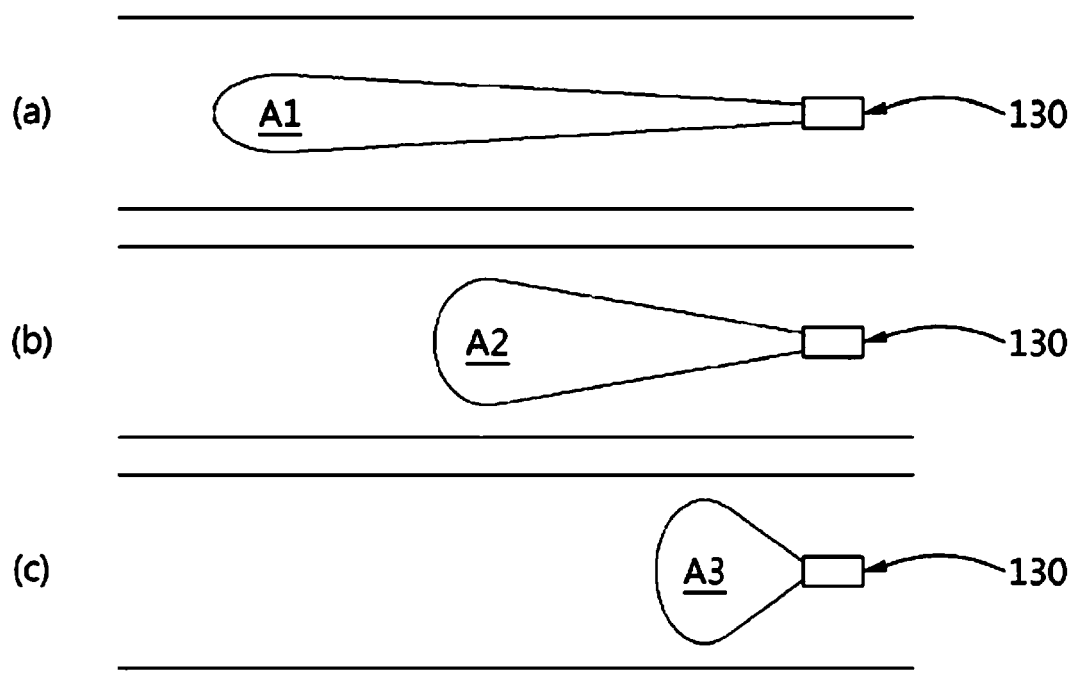
FIG. 6 shows an irradiation pattern of the headlight assembly shown in FIG. 3, FIG. 4 and FIG. 5.
Figure 7:
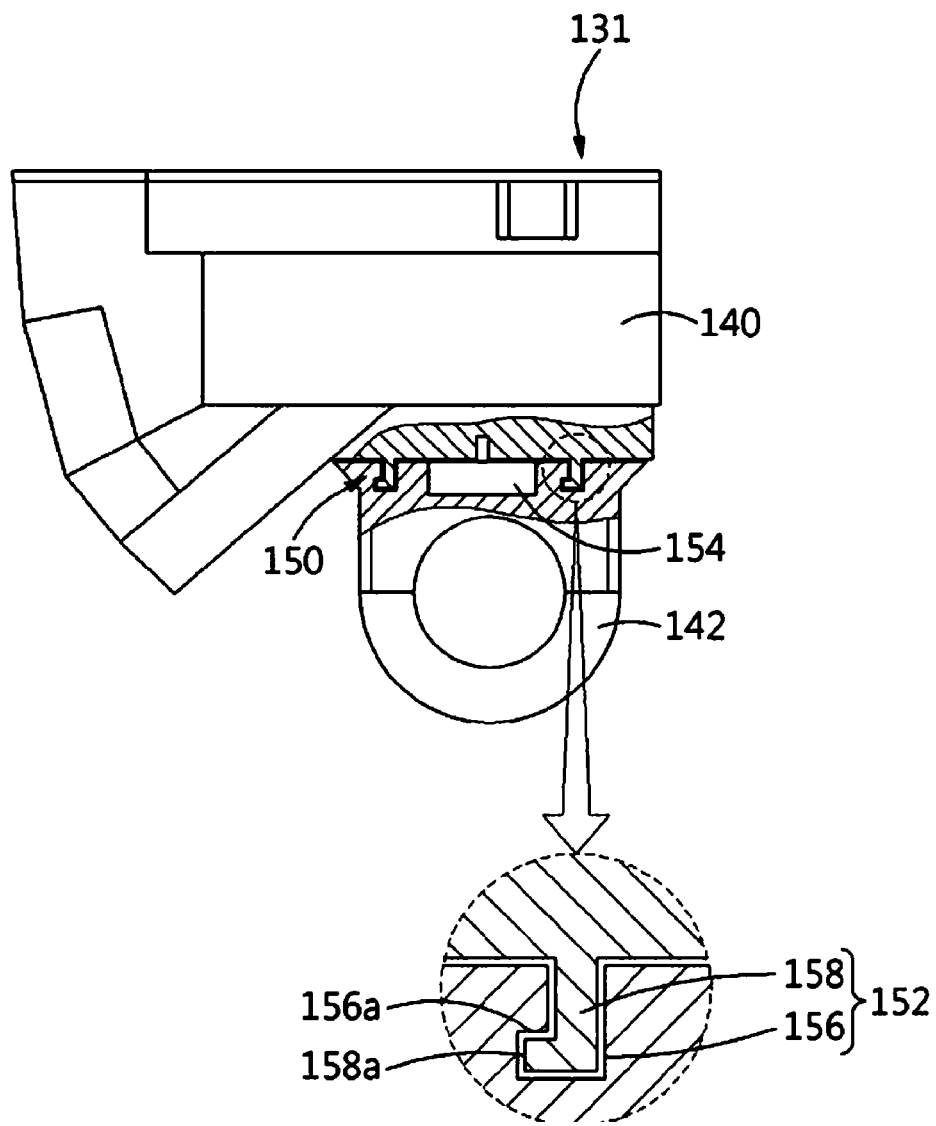
FIG. 7 is a cutaway view of a portion of the headlight assembly shown in FIG. 3.

FIG. 1 is a diagram showing an intelligent headlight system 100 for a bicycle according to an embodiment of the inventive concept. FIG. 2 shows a control configuration of the intelligent headlight system 100 shown in FIG. 1. FIG. 3, FIG. 4 and FIG. 5 are respectively side, front and perspective views showing a headlight assembly 130 of the intelligent headlight system 100 shown in FIG. 1. FIG. 6 shows an irradiation pattern of the headlight assembly 130 shown in FIG. 3, FIG. 4 and FIG. 5. FIG. 7 is a cutaway view of a portion of the headlight assembly 130 shown in FIG. 3.

Referring to FIGS. 1 and 2, the intelligent headlight system 100 for a bicycle according to an embodiment of the inventive concept includes a bicycle body 110, a mobile terminal 120, and the headlight assembly 130.

The bicycle body 110 may include various types of bicycles on which a rider rides. Specifically, the bicycle body 110 according to the present embodiment may include all types of bicycles having the headlight assembly 130 for performing illumination in a front direction. In one example, the intelligent headlight system 100 according to an embodiment of the inventive concept may be applied to other means for transportation that requires the headlight assembly 130, such as an electric wheelchair or electric quick board. However, a following description is limited to the present embodiment where the headlight assembly 130 is installed on the bicycle.

The mobile terminal 120 is a terminal device formed in a portable shape. The rider may input and manipulate the mobile terminal 120 while the rider is moving. The mobile terminal may transmit information to other devices or communication servers through wired communication and wireless communication. That is, a trend appears that the mobile terminal 120 has a variety of functions in a small size thereof due to recent development of electronic technology. Due to development of wireless communication technology, the mobile terminal may wirelessly connect with other devices even without a separate connection line and a connection terminal. Hereinafter, in the present embodiment, it is assumed that the rider of the bicycle body 110 carries the mobile terminal 120. The inventive concept is not limited thereto. The mobile terminal 120 may be mounted on the bicycle body 110.

For example, the mobile terminal 120 includes a mobile phone, a smartphone, a PDA, a tablet PC, a notebook, and the like. Hereinafter, in the present embodiment, for convenience of description, it is assumed that the mobile terminal 120 is a smartphone. The smartphone is an intelligent terminal in which computer-aided functions such as Internet communication and information search are added to a call function. The smartphone is widely spread in recent years and recognized as a necessity of life. The smartphone include an operating system such as Android or iOS. Various types of application programs may be utilized by installing various kinds of applications.

As shown in FIG. 1 and FIG. 2, the mobile terminal 120 includes a manipulator 121, a display 122, a terminal controller 123, a terminal transceiver 124, a GPS module 125, a gyro sensor module 126, a navigation module 127, an acceleration sensor module 128, and a luminance sensor module 129.

The manipulator 121 is a component for inputting a rider command to the mobile terminal 120 and may be embodied as a push button or a touch screen. Hereinafter, in the present exemplary embodiment, the manipulator 121 of the mobile terminal 120 includes both a push button and a touch screen.

The display 122 is a component for displaying an operation status and various information of the mobile terminal 120 to the rider and may be embodied as a display panel or an LED lamp. In the present embodiment, the display 122 of the mobile terminal 120 includes a display panel, and a touch screen is disposed on the display panel.

The terminal controller 123 is a component for analyzing various information of the mobile terminal 120 or controlling the operation of the mobile terminal 120 and may be connected to other components of the mobile terminal 120 to transmit a signal thereto. The terminal controller 123 may include a terminal storage 123a for storing data of various information and applications required for operation control of the mobile terminal 120.

The terminal transceiver 124 is a component for transmitting various information and commands of the mobile terminal 120 to the headlight assembly 130 and may be connected to the headlight assembly 130 via at least one of a wired communication scheme and a wireless communication scheme. Hereinafter, in the present embodiment, it will be assumed that the terminal transceiver 124 is connected to a headlight transceiver 136 of the headlight assembly 130 described later via a wireless communication scheme. In one example, the terminal transceiver 124 and the headlight transceiver 136 may be connected to each other via a short-range wireless communication scheme such as Bluetooth, NFC (Near Field Communication), beacon, or the like.

The GPS module 125 is a component for detecting current location information of the mobile terminal 120. The terminal controller 123 may calculate a current travel velocity of the bicycle body 110 based on change in a position of the mobile terminal 120. That is, since the rider riding on the bicycle body 110 carries the mobile terminal 120, the position of the mobile terminal 120 is the same as the position of the bicycle body 110. Using this fact, the travel velocity of the bicycle body 110 may be calculated based on the change of the position of the mobile terminal 120.

The gyro sensor module 126 is a component for detecting an angular velocity change of the mobile terminal 120 when the bicycle body 110 is turned. The terminal controller 123 may calculate a current travel angular velocity of the bicycle body 110 based on change in the angular velocity of the mobile terminal 120. That is, when the bicycle body 110 turns into a specific direction, the angular velocity of the mobile terminal 120 is the same as the angular velocity of the bicycle body 110. Using this fact, the travel angular velocity of the bicycle body 110 may be calculated based on the change in the angular velocity of the mobile terminal 120.

The navigation module 127 is a component for providing surrounding map information of the mobile terminal 120 when the bicycle body 110 travels. Based on the surrounding map information of the mobile terminal 120, the terminal controller 123 may calculate the travel direction of the bicycle body 110. That is, the travel direction of the bicycle body 110 may be calculated in advance by analyzing map information provided from the mobile terminal 120 at a current position. For reference, the navigation module 127 may include a component similar to the GPS module 125 to perform a direction guide based on the current position. However, in the present embodiment, it is assumed that the GPS module 125 and the navigation module 127 are separately installed to perform different functions.

The acceleration sensor module 128 is a component for measuring an instantaneous velocity change of the mobile terminal 120 when the bicycle body 110 is decelerated. The instantaneous velocity change of the mobile terminal 120 may be used to calculate the instantaneous velocity change of the bicycle body 110. That is, when the bicycle body 110 suddenly stops due to an accident or a collision risk, the acceleration sensor module 128 may determine whether the bicycle body 110 is in a sudden stop state by analyzing the velocity change of the rapidly decelerated mobile terminal 120.

The luminance sensor module 129 is a component for measuring a surrounding luminance of the mobile terminal 120 when the bicycle body 110 travels. The surrounding luminance of the bicycle body 110 may be determined based on the surrounding luminance of the mobile terminal 120. That is, since the rider rides on the bicycle body 110 while carrying the mobile terminal 120, the luminance measured by the luminance sensor module 129 of the mobile terminal 120 may be the same as the surrounding luminance of the bicycle body 110.

In one example, the terminal controller 123 may be communicatively connected to the manipulator 121, the GPS module 125, the gyro sensor module 126, the navigation module 127, the acceleration sensor module 128, and the luminance sensor module 129. Thus, the input information of the manipulator 121, the location information of the GPS module 125, the travel angular velocity information of the gyro sensor module 126, the map information of the navigation module 127, the velocity change information of the acceleration sensor module 128, and the luminance information of the luminance sensor module 129 may be transmitted to the terminal controller 123. The operation scheme and irradiation pattern of the headlight assembly 130 may be calculated by the terminal controller 123 based on the transmitted information.

That is, the mobile terminal 120 may detect the travel situation and surrounding environment of the bicycle body 110 and then calculate an operation scheme and irradiation pattern of the headlight assembly 130 based on the detected travel situation and surrounding environment. The operation scheme and irradiation pattern of the headlight assembly 130 calculated as described above may be transmitted to the headlight transceiver 136 through the terminal transceiver 124. Alternatively, the mobile terminal 120 may detect the travel situation and surrounding environment of the bicycle body 110 and transmit only the detected value to the headlight assembly 130. In this case, it is preferable that the headlight assembly 130 directly calculates an operation scheme and irradiation pattern based on the detected value of the mobile terminal 120 and then operate based on the calculated operation scheme and irradiation pattern. Hereinafter, in this embodiment, it is assumed that the mobile terminal 120 calculates the operation scheme and irradiation pattern of the headlight assembly 130 and transmits the calculated operation scheme and irradiation pattern to the headlight assembly 130.

Further, the mobile terminal 120 of the present embodiment may include an application for controlling the operation of the headlight assembly 130. The applications may be used to control the operation of the headlight assembly 130 or to set a set value needed to control the headlight assembly 130. That is, in the present embodiment, at least one of the travel velocity range of the bicycle body 110, the irradiation angle, the irradiation distance, the irradiation area, the irradiation form, the luminance, or the illumination color of the headlight assembly 130 may be set using the application of the mobile terminal 120. For reference, FIG. 9A to FIG. 9D shows a screen of the application of the mobile terminal 120 according to the present embodiment. Various set values for controlling the operation of the headlight assembly 130 may be specified using the application and the manipulator 121 of the mobile terminal 120.

Referring to FIG. 1 to FIG. 7, the headlight assembly 130 is a device for illuminating a region in front of the bicycle body 110. The headlight assembly 130 may be installed on a front portion of the bicycle body 110 to be oriented in a front direction. In this connection, the headlight assembly 130 may be communicatively connected to the mobile terminal 120 in a wireless manner to receive various information transmitted from the mobile terminal 120. Further, the headlight assembly 130 may vary the irradiation pattern based on the travel situation and surrounding environment of the bicycle body 110.

The headlight assembly 130 may include a plurality of headlights 132, 133, and 134 which are selectively activated based on the travel velocity of the bicycle body 110. Between the plurality of headlights 132, 133, and 134, at least one of the irradiation angle, irradiation distance, irradiation area, irradiation form, luminance, or illumination color thereof may be set to be different, based on the travel velocity range of the bicycle body 110. Hereinafter, in the present embodiment, it is assumed that the number of the headlights 132, 133, and 134 is three for the convenience of description. However, the inventive concept is not limited thereto. The number of the headlights may vary based on a design condition and situation of the intelligent headlight system 100.

For example, the headlight assembly 130 may include a headlight housing 131, a first headlight 132, a second headlight 133, a third headlight 134, and a headlight control module 135.

As shown in FIG. 3 to FIG. 7, the headlight housing 131 may be fixed to the bicycle body 110 detachably. The headlight housing 131 may be configured to receive therein the first headlight 132, the second headlight 133, the third headlight 134, and the headlight control module 135. For example, the headlight housing 131 may include a housing body 140 and a housing fixed portion 142.

The housing body 140 may be formed into a box shape to receive the first headlight 132, the second headlight 133, the third headlight 134, and the headlight control module 135. A housing cover 140a may be detachably disposed on a top surface of the housing body 140 to replace and maintain the headlight control module 135. In the front face of the housing body 140, a first headlight mount 132a for mounting the first headlight 132 thereon, a second headlight mount 133a for mounting the second headlight 133 thereon, and a third headlight mount 134a for mounting the third headlight 134 thereon may be formed.

The first headlight mount 132a, the second headlight mount 133a, and the third headlight mount 134a may be vertically arranged in a row on the front face of the headlight housing 131. However, the inventive concept is not limited to this. The first headlight mount 132a and the second headlight mount 133a and the third headlight mount 134a may be arranged horizontally in a line on the front face of the headlight housing 131. Alternatively, the first headlight mount 132a and the second headlight mount 133a and the third headlight mount 134a may be arranged in a zigzag shape, a polygonal shape, a circle shape, or the like, rather than in a line.

In this connection, the first headlight mount 132a may be placed at a top level of the front face of the housing body 140 and may have an opening defined therein horizontally open forwardly from the headlight housing 131 to guide illumination from the first headlight 132 horizontally and forwardly. The second headlight mount 133a may be placed at a middle level of the front face of the housing body 140 and may have an opening defined therein open forwardly and inclinedly and downwardly from the headlight housing 131 to guide illumination from the second headlight 133 to be inclined downwardly from light beams from the first headlight 132 and forwardly. Further, the third headlight mount 134a may be placed at a bottom level of the front face of the housing body 140. The third headlight mount 134a may have an opening defined therein open forwardly and inclinedly and downwardly from the headlight housing 131 to guide illumination from the third headlight 134 to be inclined downwardly from light beams from the second headlight 133 and forwardly.

In one example, the headlight housing 131 may have a heat-dissipation hole 131a defined therein for air-cooling the first headlight 132, second headlight 133, third headlight 134, and headlight control module 135. The heat-dissipation hole 131a may allow air to be introduced into a front face of the housing body 140 and then to pass through the first headlight 132, the second headlight 133, the third headlight 134, and the headlight control module 135 to an outside. That is, an inlet of the heat-dissipation hole 131a may be formed in a shape surrounding the first headlight mount 132a, the second headlight mount 133a, and the third headlight mount 134a. An outlet of the heat-dissipation hole 131a may be formed behind the headlight control module 135. The heat-dissipation hole 131a may be configured to allow external air to be introduced into the inlet and flow along an outer face of each of the first headlight 132, the second headlight 133, the third headlight 134, and the headlight control module 135 to the outside.

The housing fixed portion 142 may be mounted on and fixed to a frame of the bicycle body 110. That is, the housing fixed portion 142 may be formed of a fastening structure for easily mounting on or detaching from the frame of the bicycle body 110 based on a situation. The housing fixed portion 142 may be formed of a clip structure, a clamping structure, or a fastening structure that is coupled to the frame of the bicycle body 110.

In this connection, a housing coupling mate 144 may be formed in a top of the housing fixed portion 142 and a bottom of the housing body 140 to couple the housing body 140 to the housing fixed portion 142. For example, the housing coupling mate 144 may include a groove 144a formed in the top of the housing fixed portion 142 and a protrusion 144b formed on the bottom of the housing body 140 to be inserted to the groove 144a in a sliding coupling manner. That is, the housing fixed portion 142 may be always fixed to the frame of the bicycle body 110. The housing body 140 may be selectively mounted to the housing fixed portion 142 only when the bicycle body 110 is used. Accordingly, when the rider does not ride the bicycle body 110, the housing body 140 may be separated from the housing fixed portion 142 and stored in a separate manner to prevent the headlight assembly 130 from being lost.

As shown in FIG. 3, FIG. 4 and FIG. 6, the first headlight 132 may be disposed on the first headlight mount 132a of the headlight housing 131. The first headlight 132 may be selectively activated when the travel velocity of the bicycle body 110 calculated from the mobile terminal 120 is included in a first set velocity range.

The first headlight 132 may be configured to horizontally illuminate a long-distance region A1 in front of the bicycle body 110 in a long and narrow irradiation pattern.

As shown in FIG. 3, FIG. 4 and FIG. 6, the second headlight 133 may be disposed on the second headlight mount 133a of the headlight housing 131. The second headlight 133 may be activated when the travel velocity of the bicycle body 110 calculated from the mobile terminal 120 is included in a second set velocity range lower than the first set velocity range.

The second headlight 133 may be configured to illuminate a middle-distance region A2 in front of the bicycle body 110. An irradiation pattern to the middle-distance region A2 may be shorter and wider than the irradiation pattern to the long-distance region A1 and may be illuminated inclinedly and downwardly from the first headlight 132.

As shown in FIG. 3, FIG. 4 and FIG. 6, the third headlight 134 may be placed on the third headlight mount 134a of the headlight housing 131. The third headlight 134 may be activated when the travel velocity of the bicycle body 110 calculated from the mobile terminal 120 is included in a third set velocity range lower than the second set velocity range.

The third headlight 134 may be configured to illuminate a short-distance region A3 in front of the bicycle body 110. The irradiation pattern to the front short-distance region A3 is shorter and wider than that to the middle-distance region A2 and may be illuminated inclinedly and downwardly from the second headlight 133.

In one example, illumination filters 132b, 133b, and 134b may be disposed on front faces of the first headlight 132 and the second headlight 133 and the third headlight 134 respectively. The illumination filters 132b, 133b, and 134b are respectively designed to protect the first headlight 132, the second headlight 133, and the third headlight 134 from foreign matter or impact, as well as to produce color or form of illumination. That is, each of the illumination filters 132b, 133b, and 134b may be formed of a transparent body to allow the transmission of illumination and may be formed of a material that is not easily broken by an external impact. Further, each of the illumination filters 132b, 133b, and 134b may be formed of concave lenses or convex lenses based on need, or a specific pattern may be printed on surfaces thereof.

The illumination filters 132b, 133b, and 134b may be removably disposed on the first headlight mount 132a and the second headlight mount 133a and the third headlight mount 134a respectively. Alternatively, the illumination filters 132b, 133b, and 134b may be removably disposed on the front faces of the first headlight 132 and the second headlight 133 and the third headlight 134 respectively. Hereinafter, in this embodiment, it is assumed that the illumination filters 132b, 133b, and 134b are disposed on the front faces of the first headlight 132 and the second headlight 133 and the third headlight 134 respectively, and are removed when necessary. However, the inventive concept is not limited thereto. The positioning of the illumination filters 132b, 133b, and 134b may be variously modified.

Referring to FIG. 2 and FIG. 3, the headlight control module 135 may be configured to selectively control the activation of the first headlight 132, the second headlight 133, and the third headlight 134 based on the operation command and the irradiation pattern transmitted from the mobile terminal 120 depending on the travel situation and surrounding environment of the bicycle body 110. The headlight control module 135 may be disposed inside the housing body 140 of the headlight housing 131.

For example, the headlight control module 135 may include the headlight transceiver 136, a power supply 137, and a headlight controller 138.

The headlight transceiver 136 may be connected to the terminal transceiver 124 of the mobile terminal 120 via a wireless communication scheme. The headlight transceiver 136 may receive a travel situation and surrounding environment of the bicycle body 110, an operation command, an irradiation pattern, and the like from the terminal transceiver 124 of the mobile terminal 120. For example, the headlight transceiver 136 may receive information about the travel velocity, travel angular velocity, surrounding map information, travel direction, surrounding luminance, sudden stop, or the like of the bicycle body 110.

The power supply 137 may be disposed inside the housing body 140 of the headlight housing 131. Removing the housing cover 140a from the housing body 140 may allow replacement and maintenance of the power supply 137. The power supply 137 may be configured to selectively supply power to the first headlight 132, the second headlight 133, the third headlight 134, the headlight transceiver 136, and the headlight controller 138. In this embodiment, it is assumed that the power supply 137 is a rechargeable battery that may be reused after being recharged. However, the inventive concept is not limited to this and various modifications are possible.

The headlight controller 138 may be connected to the headlight transceiver 136, the first headlight 132, the second headlight 133, the third headlight 134, and a headlight pivoting module 150 to be described later and may deliver a signal thereto. The headlight controller 138 may control power to be supplied to the first headlight 132, the second headlight 133, the third headlight 134, and the headlight pivoting module 150 based on an operation command and irradiation pattern received from the mobile terminal 120. The headlight controller 138 may have, at one side thereof, a headlight storage 138a for storing various information and data necessary for the operation control of the headlight assembly 130.

Referring to FIGS. 2 and 7, the headlight assembly 130 according to the present embodiment may further include the headlight pivoting module 150 for pivoting the first headlight 132, the second headlight 133, and the third headlight 134. The headlight pivoting module 150 may rotate an irradiation direction of the first headlight 132, the second headlight 133, or the third headlight 134 based on the pivoting direction and pivoting angle of the headlight calculated from the mobile terminal 120. In this connection, the headlight pivoting module 150 may be configured to pivot at least one of the first headlight 132, the second headlight 133, or the third headlight 134.

Hereinafter, in the present embodiment, the headlight pivoting module 150 is provided in the housing fixed portion 142 of the headlight assembly 130 so that an entirety of the housing body 140 is pivoted. However, the inventive concept is not limited to this. Each headlight pivoting module 150 may be installed on each of the first headlight 132, the second headlight 133 and the third headlight 134, such that the pivoting operations of the first headlight 132, the second headlight 133 and the third headlight 134 may be performed separately.

For example, the headlight pivoting module 150 may include a pivoting support 152 and a pivoting driver 154.

The pivoting support 152 may be formed in the housing fixed portion 142 to pivot the housing body 140 in the turning direction of the bicycle body 110. The pivoting driver 154 may be disposed on the pivoting support 152 to pivot the housing body 140 of the headlight housing about the pivoting support 152 based on the pivoting direction and the pivoting angle.

The pivoting support 152 may be formed between the upper and lower portions of the housing fixed portion 142. That is, the groove 144a receiving the protrusion 144b of the housing body 140 may be formed in a top of the housing fixed portion 142. A fastening structure fixed to the frame of the bicycle body 110 may be formed on the bottom of the housing fixed portion 142. The upper and lower portions of the housing fixed portion 142 may be separated from each other. The pivoting support 152 may be formed between the upper and lower portions of the housing fixed portion 142 to pivotably connect the upper portion of the housing fixed portion 142 to the lower portion of the housing fixed portion 142.

For example, in the present exemplary embodiment, the pivoting support 152 includes a pivoting groove 156 formed in a circular or arc shape in a top surface of the lower portion of the housing fixed portion 142, and a pivoting protrusion 158 to be slidably inserted into the pivoting groove 156 and protruding on a bottom surface of the upper portion of the housing fixed portion 142. In this connection, at least one of the pivoting support 152 or housing fixed portion 142 may have a connection structure for pivotably connecting the upper and lower portions of the housing fixed portion 142 to each other so that the upper and lower portions of the housing fixed portion 142 are not separated from each other unintentionally. For example, the pivoting protrusion 158 has a stopping protrusion 158a protruding in a direction intersecting a direction in which the pivoting protrusion 158 is separated from the pivoting groove 156, while the pivoting groove 156 has a stepped stopper 156a to be engaged with the stopping protrusion 158a of the pivoting protrusion 158.

The pivoting driver 154 may include an electric motor disposed on the pivoting support 152. For example, the electric motor may be installed in the lower portion of the housing fixed portion 142 and a rotation shaft of the electric motor may be connected to a rotation center of the upper portion of the housing fixed portion 142. Thus, when the pivoting driver 154 is driven, the lower portion of the housing fixed portion 142 may be fixed, and the upper portion of the housing fixed portion 142 may be pivoted by the pivoting driver 154 and the housing body 140 may also be pivoted together with the upper portion of the housing fixed portion 142.

The control method and effect of the intelligent headlight system 100 for a bicycle according to an embodiment of the inventive concept as configured as described above will be described.

FIG. 8 is a view showing a control method of the intelligent headlight system 100 according to an embodiment of the inventive concept, FIG. 9A to FIG. 9D shows an application screen of the mobile terminal 120 used for the control method of the intelligent headlight system 100 shown in FIG. 8.

Referring to FIG. 8, the control method of the intelligent headlight system 100 according to an embodiment of the inventive concept may include a step S100 in which headlight assembly 130 mounted on the bicycle body 110 is connected to the rider's mobile terminal 120 via a wireless communication scheme, steps S101 and S102 in which when the mobile terminal 120 and the headlight assembly 130 are connected to each other wirelessly, the headlights 132, 133, and 134 of the headlight assembly 130 are turned on for a preset time during in a predetermined pattern, and then enters an operation standby state, a step S103 inputting a set value for controlling the headlight assembly 130 by manipulating an application of the mobile terminal 120; a step S104 of operating the headlight assembly 130 by manipulating the application of the mobile terminal 120; steps S105 and S106 of calculating an irradiation pattern of the headlight assembly 130 by measuring various travel information of the bicycle body 110 by the mobile terminal 120, a step S107 in which the headlight assembly 130 receives the irradiation pattern of the headlight assembly 130 from the mobile terminal 120 and performs illumination based on the irradiation pattern of the headlight assembly 130, steps S108 and S109 in which the headlight assembly 130 is deactivated using the application of the mobile terminal 120 and the headlight assembly 130 returns to the operation standby state, and steps S110 and S111 in which when the wireless connection between the mobile terminal 120 and the headlight assembly 130 is disabled, the headlight assembly 130 enters a sleep state for power saving.

In the step S100 where the headlight assembly 130 and the mobile terminal 120 are connected with each other via a wireless communication scheme, the headlight transceiver 136 of the headlight assembly 130 and the terminal transceiver 124 of the mobile terminal 120 are connected with each other for mutual signal transmission via a short-range wireless communication scheme such as Bluetooth. Therefore, the headlight assembly 130 and the mobile terminal 120 are automatically connected to each other wirelessly when they are close to each other by a predefined distance via a short-range wireless communication scheme.

Figure 9A:
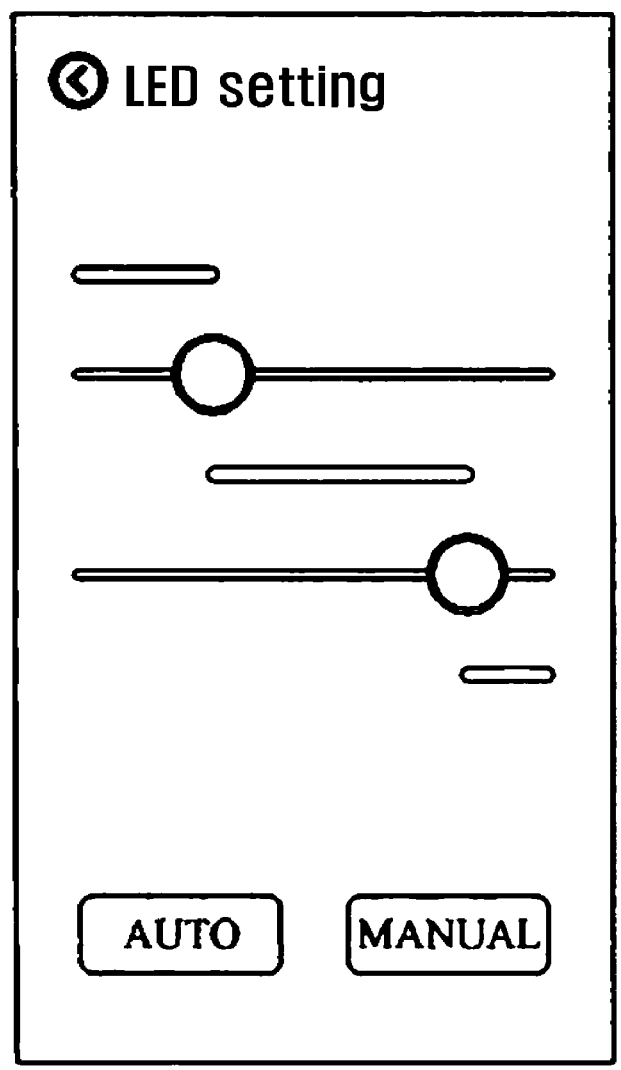
FIG. 9A to FIG. 9D shows an application screen of a mobile terminal used for the control method of the intelligent headlight system shown in FIG. 8.
Figure 9B:
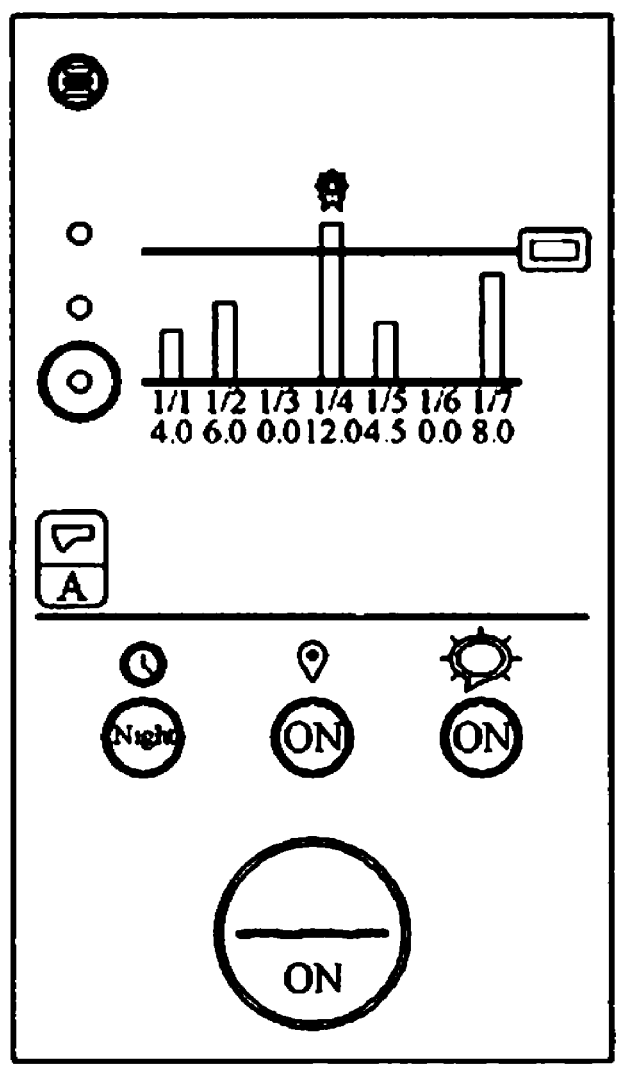
Figure 9C:
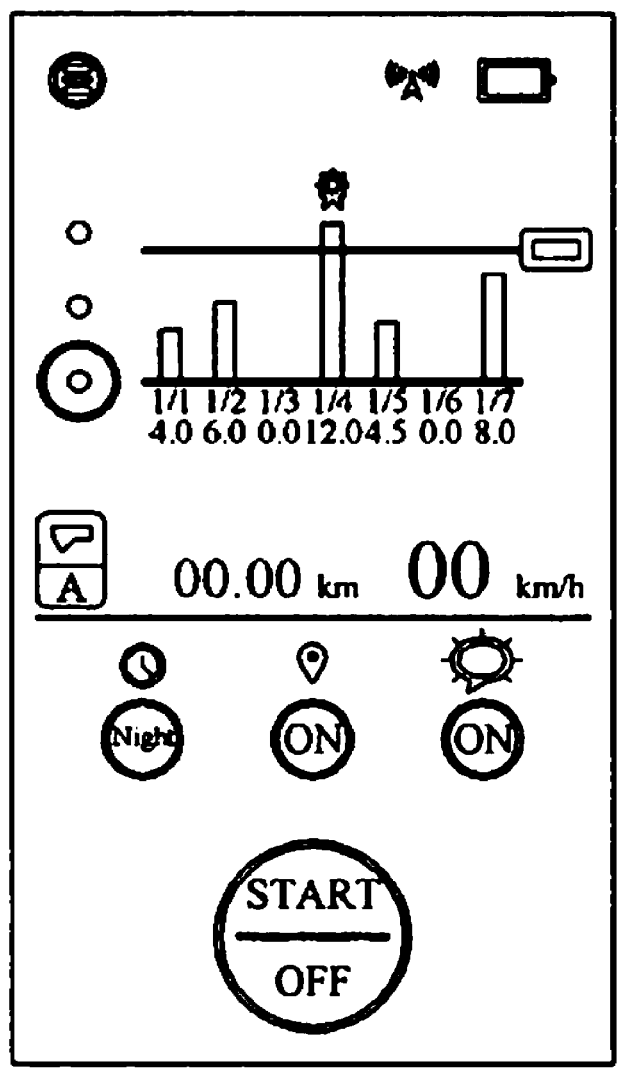

When "ON" on the application of the mobile terminal 120 is touched by the rider while the application is deactivated as shown in FIG. 9B, the headlight assembly 130 and the mobile terminal 120 are activated and wirelessly connected to each other as shown in FIG. 9C. That is, when the application of the mobile terminal 120 is inactivated, wireless connection is not possible and measurement of the travel situation or surrounding environment of the bicycle body 110 is not performed. In contrast, when the application of the mobile terminal 120 is activated, wireless connection is possible. However, the travel situation or surrounding environment of the bicycle body 110 may not be measured.

In the steps S101 and S102 in which the headlights 132, 133 and 134 are turned on in a preset pattern for a preset time duration and then enter the operation standby state, when the headlight transceiver 136 and the terminal transceiver 124 are connected to each other wirelessly, the headlights 132, 133 and 134 are turned on in a preset pattern and then enter the operation standby state. That is, when the rider approaches the bicycle body 110 equipped with the headlight assembly 130 while carrying the mobile terminal 120, the headlight assembly 130 and the mobile terminal 120 are automatically wirelessly connected to each other. At the same time, the headlight assembly 130 lights up in a predetermined pattern to inform the rider of the connection state between the headlight assembly 130 and the mobile terminal 120.

The preset pattern in which the headlight assembly 130 lights up may be set using the application of the mobile terminal 120 shown in FIG. 9A. In this embodiment, it is assumed that the headlight assembly 130 flickers for a preset time duration at a specific number of times or at a specific time interval as soon as the wireless connection thereof with the mobile terminal 120 is established.

In step S103 of entering the set value, the set value to control the operation of the headlight assembly 130 may be set using the application of the mobile terminal 120. For example, the travel velocity range of the bicycle body 110 may be set using the application screen shown in FIG. 9A. In addition, various set values may be entered or adjusted using a setting menu of the application of the mobile terminal 120.

For example, the set values may include the notification pattern of the headlight assembly 130 when the headlight assembly 130 and the mobile terminal 120 are connected to each other wirelessly, the luminance value of the surrounding to distinguish between day and night, the irradiation pattern of the headlight according to the travel velocity range, the luminance and illumination form of the headlight assembly 130, a reference value for distinguishing between the wireless connection from the wireless disconnection, and a reference value for correcting the travel velocity.

In the step S104 of operating the headlight assembly 130, the headlight assembly 130 is activated using the application of the mobile terminal 120. That is, when the rider touches a "START" button on the screen of the application shown in FIG. 9C, the headlight assembly 130 is normally activated in an activated state as shown in the screen of the application shown in FIG. 9D.

Figure 9D:
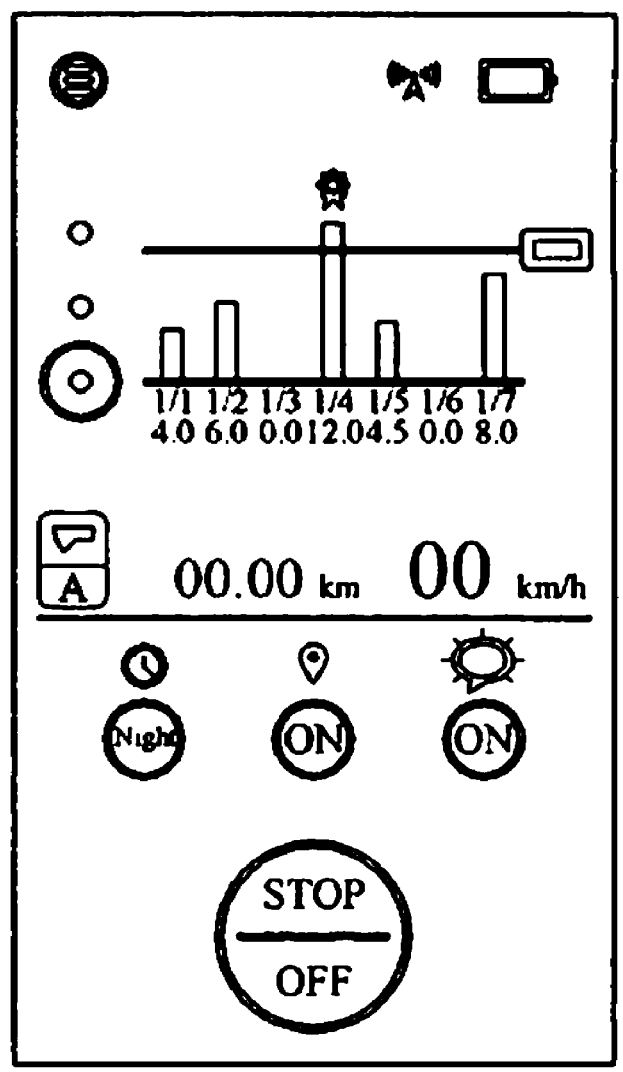

The activated state in FIG. 9C refers to an operation wait standby state of the headlight assembly 130. In this state, the headlight assembly 130 and the mobile terminal 120 are wirelessly connected to each other, and the operation of the headlight assembly 130 is in an idle state. In the activated state and the operation start state as shown in FIG. 9D, the operation of the headlight assembly 130 is normally performed. In this state, the headlight assembly 130 and the mobile terminal 120 are wirelessly connected to each other, and the headlight assembly 130 is normally activated.

In the steps S105 and S106 for calculating the irradiation pattern, the mobile terminal 120 may measure various travel information of the bicycle body 110 and then the various travel information may be analyzed to calculate the irradiation pattern of the headlight assembly 130. The various travel information may refer to measurements of the travel situation and surrounding environment of the bicycle body 110 and may include the travel velocity measured by the GPS module 125, the travel angular velocity measured by the gyro sensor module 126, the map information measured by the navigation module 127, the change in the travel velocity measured by the acceleration sensor module 128, and a surrounding luminance measured by the luminance sensor module 129.

In step S107 of illuminating a front region by the headlight assembly 130, the headlight assembly 130 receives the irradiation pattern of the headlight assembly 130 from the mobile terminal 120 and operates based on the irradiation pattern.

In one example, in this embodiment, the step S103 of inputting the set value based on the measurement value of the mobile terminal 120 and the irradiation pattern of the headlight assembly 130, the steps S105 and S106 of calculating the irradiation pattern, and the illumination step S107 by the headlight assembly 130 may be described more specifically as follows.

For example, in the step S103 of inputting the set value, the irradiation pattern of the headlight assembly 130 according to the set velocity range of the bicycle body 110 may be set using the application. In the steps S105 and S106 for calculating the irradiation pattern, the irradiation pattern of the headlight assembly 130 may be calculated based on the current travel velocity of the bicycle body 110 measured by the GPS module 125 of the mobile terminal 120. In the step S107 of illuminating the front area using the headlight assembly 130, at least one of the headlights 132, 133, and 134 of the headlight assembly 130 which corresponds to the calculated irradiation pattern may be selectively activated.

In this connection, in the steps S105 and S106 for calculating the irradiation pattern, the travel velocity of the bicycle body 110 measured by the GPS module 125 may be corrected with a Kalman filter. Thus, the corrected travel velocity and an error covariance may be calculated. Then, the irradiation pattern of the headlight assembly 130 may be calculated by comparing the corrected travel velocity and the error covariance with the set velocity ranges.

Then, the irradiation pattern of the headlight assembly 130 may be configured such that the higher the travel velocity of the bicycle body 110, the longer and narrower the irradiation pattern whereas the lower the travel velocity of the bicycle body 110, the wider and shorter the irradiation pattern.

The steps S105 and S106 for calculating the irradiation pattern using the Kalman filter will be describe in more detail as follows.

The GPS module 125 measures the travel velocity of the bicycle body 110. However, the travel velocity measured by the GPS module 125 may be often different from an actual velocity. Thus, the Kalma filter is applied to correct the difference. Thus, both a predicted value $\hat{X}_k^-$ as calculated mathematically from an estimate $\hat{X}_{k-1}^-$ at a previous time point k−1 and a current measurement $z_k$ as measured at a current time point k are subject to a Kalman filter based on a Kalman gain K to obtain a correct estimate $\hat{X}_k$. Thus, the correct estimate may act as a corrected velocity value to more accurately represent a current travel situation.

A modeling a relationship between a travel velocity of the bicycle body and a travel acceleration thereof may be conducted as follows while assuming that in calculating the predicted value, an acceleration of the previous measurement point is maintained:

First, a state matrix X−

$$\hat{X} = \begin{bmatrix} v \\ a \end{bmatrix}$$

(v: velocity, a: acceleration) is used to obtain a predicted velocity value for a current time point k.
$\hat{X}_k^- = A\hat{X}_{k-1}$
A state transition matrix $$A = \begin{bmatrix} 1 & \Delta T \\ 0 & 1 \end{bmatrix}$$

(ΔT: a time interval between a previous measurement time point and a current measurement time point)

Calculating an error covariance predicted value is as follows:
$P_k^- = AP_{k-1}A^T + Q$, where Q denotes a system covariance.
Calculating the Kalman gain is as follows:
$K_k = P_k^- H^T (HP_k^- H^T + R)^{-1}$, wherein R denotes a measurement covariance.

Calculating the estimate is as follows:
$\hat{X}_k = \hat{X}_k^- + K_k(z_k - H\hat{X}_k^-)$ ($z_k =$ $$\hat{X}_k = \hat{X}_k^* + K_k(z_k \cdot H\hat{X}_k^*)\left(z_k = \begin{bmatrix} v \\ a \end{bmatrix}\right)$$

denotes a measurement at a current time point k). Calculating the error covariance is as follows: $P_k = P_k^- - K_k HP_k^-$ In this way, a velocity estimate $\hat{v}$ as a component at a first row and a first column of $\hat{x}_k$,
a variance $\sigma^2$ of a velocity estimate as a component at a first row and a first column of $P_k$ are used.

Given that the modeling of the Kalman filter is perfect, the state matrix at the current time point k follows a normal distribution $X_k = N(\hat{X}_k, P_k)$, and the actual velocity follows $v_k = N(\hat{v}_k, \sigma^2)$.

This may be used to determine which of the headlights 132, 133, and 134 should be turned on.

In another example, in the step S103 of entering the set value, the irradiation pattern of the headlight assembly 130 according to the travel angular velocity of the bicycle body 110 may be set using the application. In the steps S105 and S106 for calculating the irradiation pattern, the irradiation pattern of the headlight assembly 130 is calculated using the current travel angular velocity of the bicycle body 110 measured by the gyro sensor module 126 of the mobile terminal 120. In the step S107 of illuminating the front region using the headlight assembly 130, the headlights 132, 133, and 134 of the headlight assembly 130 may pivot based on the calculated irradiation pattern.

The headlight assembly 130 may use the headlight pivoting module 150 to pivot the headlights 132, 133, and 134 based on the pivoting direction and pivoting angle of the headlights 132, 133, and 134 as calculated from the travel angular velocity of the bicycle body 110.

In another example, in step the S103 of entering the set value, the irradiation pattern of the headlight assembly 130 is set using the application according to the surrounding map information of the bicycle body 110. In the steps S105 and S106 for calculating the irradiation pattern, the irradiation pattern of the headlight assembly 130 is calculated using the current map information of the bicycle body 110 provided by the navigation module 127 of the mobile terminal 120. In the step S107 of illuminating the front region using the headlight assembly 130, the headlights 132, 133, and 134 of the headlight assembly 130 may pivot based on the calculated pivoting pattern.

The headlight assembly 130 as described above uses the headlight pivoting module 150 to pivot the headlights 132, 133, and 134 based on the pivoting direction and pivoting angle of the headlights 132, 133, and 134 as calculated from the map information of the bicycle body 110.

In another example, in the step S103 of entering the set value, the application may be used to set the irradiation pattern of the headlight assembly 130 according to the travel acceleration and rapid deceleration of the bicycle body 110 used to determine rapid deceleration of the bicycle body 110. In the steps S105 and S106 for calculating the irradiation pattern, the rapid deceleration of the bicycle body 110 is calculated using the current travel velocity change of the bicycle body 110 measured by the acceleration sensor module 128 of the mobile terminal 120. In the step S107 of illuminating the front region using the headlight assembly 130, when it is determined that the bicycle body 110 is in a sudden deceleration state, the headlights 132, 133, and 134 of the headlight assembly 130 are activated using the set irradiation pattern.

The headlight assembly 130 may rapidly flicker the headlights 132, 133, and 134 at a preset warning color to warn a surrounding vehicle of the sudden deceleration when the bicycle body 110 suddenly decelerates. In this connection, a red color is most suitable for the preset warning color. To this end, a separate warning headlight may be mounted on the headlight assembly 130. Therefore, this embodiment may prevent risk of an accident when the bicycle body 110 is suddenly stopped.

In another example, in the step S103 of entering the set value, the application may be used to set the activation or deactivation of the headlight assembly 130 or the irradiation pattern thereof according to the surrounding luminance of the bicycle body 110. In the steps S105 and S106 for calculating the irradiation pattern, the current luminance of the bicycle body 110 measured by the luminance sensor module 129 of the mobile terminal 120 may be used to determine the activation or deactivation of the headlight assembly 130 and the irradiation pattern thereof. In the step S107 of illuminating the front region using the headlight assembly 130, a headlight of the headlight assembly 130 is selectively activated based on the current luminance of the bicycle body 110. The headlights of the headlight assembly 130 are activated using the irradiation pattern calculated during the operation of the headlight assembly 130.

The headlight assembly 130 may automatically turn on or off the headlights 132, 133, and 134 based on the surrounding luminance of the bicycle body 110. That is, the headlight assembly 130 automatically activates the headlights 132, 133, and 134 of the headlight assembly 130 at night. During the day, the operation of the headlights 132, 133 and 134 of the headlight assembly 130 may be stopped automatically. Alternatively, the headlight assembly 130 may operate during the day. In this case, it is preferable to increase the visibility of the headlights 132, 133, 134 by flickering the headlights 132, 133, 134 of the headlight assembly 130.

In the steps S108 and S109 of returning the headlight assembly 130 to an operation standby state, the operation of the headlight assembly 130 is stopped via the application of the mobile terminal 120, and thus the headlight assembly 130 returns to the operation standby state. That is, when the rider touches a "STOP" button on the screen of the application shown in FIG. 9D, the operation of the headlight assembly 130 is returned from the activated state as shown in the application screen shown in FIG. 9C to the operation standby state in which the operation is not performed.

In the steps S110 and S111 of entering into the sleep state, when the wireless connection between the mobile terminal 120 and the headlight assembly 130 is disabled, it is determined that the headlight assembly 130 is not used and thus a mode thereof is switched to the sleep state for power saving.

As described above, the embodiments of the inventive concept have been described with reference to details such as the specific components, and the limited embodiments and drawings which may be provided to aid in understanding of the inventive concept which is not limited to the above embodiments. Many modifications and variations are possible in this context to those skilled in the art of the inventive concept. Accordingly, the idea of the inventive concept should not be limited to the described embodiments. Not only the scope of claims described below, but also all equivalents or equivalent modifications to the scope of claims, will fall within the scope of the inventive concept.

What is claimed is:

1. An intelligent headlight system for a bicycle, the system comprising:
    a bicycle body;
    a mobile terminal carried by a rider of the bicycle body and having a GPS module for detecting position information of the bicycle body to measure a travel velocity based on the position information of the bicycle body; and
    a headlight assembly disposed on the bicycle body to illuminate a region in front of the bicycle body, wherein the headlight assembly is communicatively connected to the mobile terminal, and is configured to vary an irradiation pattern based on the travel velocity of the bicycle body,
    wherein the headlight assembly includes:
    a headlight housing removably coupled to the bicycle body;
    a first headlight mounted on a first headlight mount of the headlight housing and configured to illuminate a long-distance region in front of the bicycle body, wherein the first headlight is activated when the travel velocity of the bicycle body is included in a first set velocity range;
    a second headlight mounted on a second headlight mount of the headlight housing and configured to illuminate a middle-distance region in front of the bicycle body, wherein the second headlight is activated when the travel velocity of the bicycle body is included in a second set velocity range lower than the first set velocity range;
    a third headlight mounted on a third headlight mount of the headlight housing and configured to illuminate a short-distance region in front of the bicycle body, wherein the third headlight is activated when the travel velocity of the bicycle body is included in a third set velocity range lower than the second set velocity range; and
    a headlight control module disposed inside the headlight housing and configured to receive an irradiation pattern calculated from the mobile terminal based on the travel velocity of the bicycle body and to selectively control the activation of the first headlight, the second headlight, or the third headlight based on the received irradiation pattern.

2. The intelligent headlight system of claim 1,
    wherein at least one of an irradiation angle, an irradiation distance, an irradiation area, an irradiation form, a luminance, or an illumination color is set to be different between the plurality of headlights based on a travel velocity range of the bicycle body.

3. The intelligent headlight system of claim 1, wherein the headlight control module includes:
    a headlight transceiver connected to the mobile terminal via a wireless communication scheme to receive the irradiation pattern based on the travel velocity of the bicycle body;
    a power supply disposed inside the headlight housing to power the first headlight, the second headlight, the third headlight, and the headlight transceiver; and
    a headlight controller connected to the headlight transceiver and the power supply to control power to be supplied to the first headlight and the second headlight and the third headlight based on the travel velocity of the bicycle body.

4. The intelligent headlight system of claim 1, wherein the first headlight mount is placed at a top level of a front face of the headlight housing and is constructed to guide illumination from the first headlight forwardly,
- wherein the second headlight mount is placed at a middle level of the front face of the headlight housing and is constructed to guide illumination from the second headlight to be inclined downwardly from light beams from the first headlight and forwardly,
- wherein the third headlight mount is placed at a bottom level of the front face of the headlight housing and is constructed to guide illumination from the third headlight to be inclined downwardly from light beams from the second headlight and forwardly.

5. The intelligent headlight system of claim 1, wherein the headlight housing has a heat-dissipation hole for air cooling the first headlight, the second headlight, the third headlight, and the headlight control module,
- wherein the heat-dissipation hole is constructed to have a shape to allow air to be introduced into a front face of the headlight housing and then to pass through the first headlight, the second headlight, the third headlight, and the headlight control module and then to an outside.

* * * * *